INVENTOR.
John W. Theiring
BY
ATTORNEY.

Nov. 21, 1967  J. W. THEIRING  3,353,444
SIMULTANEOUS CHARGE AND READ QUANTOMETER
Filed Nov. 12, 1963  7 Sheets-Sheet 2

INVENTOR.
John W. Theiring
BY
ATTORNEY.

INVENTOR.
John W. Theiring
BY
*Roland G. Anderson*
ATTORNEY.

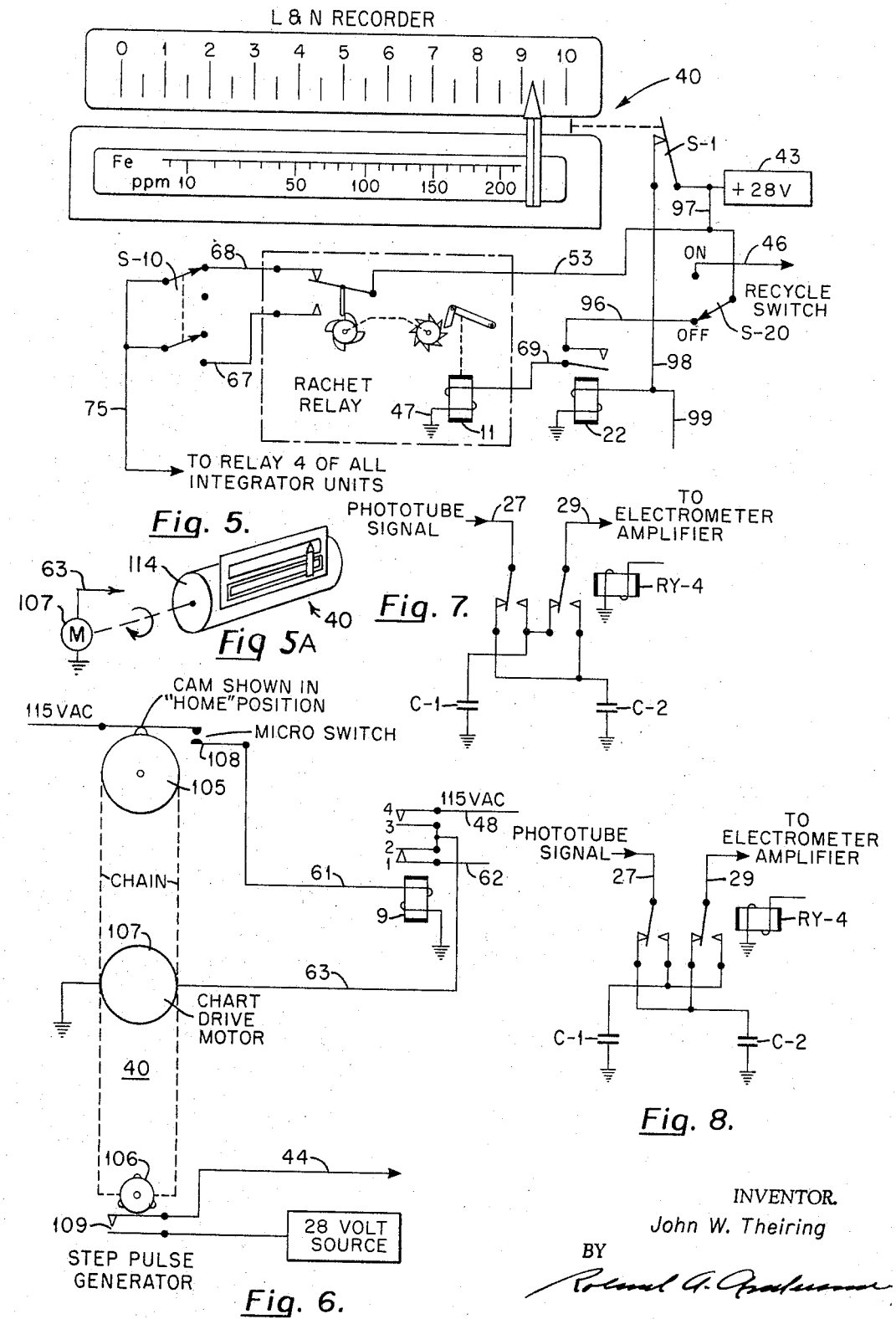

Nov. 21, 1967  J. W. THEIRING  3,353,444
SIMULTANEOUS CHARGE AND READ QUANTOMETER
Filed Nov. 12, 1963  7 Sheets-Sheet 7

INVENTOR.
John W. Theiring
BY
ATTORNEY.

United States Patent Office 3,353,444
Patented Nov. 21, 1967

3,353,444
SIMULTANEOUS CHARGE AND READ
QUANTOMETER
John William Theiring, Pittsburgh, Pa., assignor to the United States of America as represented by the United States Atomic Energy Commission
Filed Nov. 12, 1963, Ser. No. 323,184
5 Claims. (Cl. 88—14)

ABSTRACT OF THE DISCLOSURE

A spectrochemical instrument known as a "Quantometer" is utilized for determining the concentrations of a number of impurity elements in a sample material and includes an arc stand, a spectrometer unit, a plurality of integrator units, selector stepping switches for sequentially connecting the integrator units to an electrometer amplifier and a chart recorder connected to the amplifier output. Each of the integrator units is wired in such a manner as to permit the accumulated charge in respective ones of respective pairs of capacitors in each integrator (charged from a previous exposure from the arc stand) to be sequentially read out, while at the same time permitting charging of respective others of the respective pairs of capacitors in each integrator from a current exposure from the arc stand. The recorder drum is rotated in step with the channel stepping system and means are provided for automatically returning the recorder drum scale to its home position. Means are provided for suppressing the full-scale arc termination function of the recorder pen carriage until after the element read-out cycle has been completed and means are provided for terminating the arc and discharging the integrator capacitors which have just been read out when the channel stepping system has been returned to the home position. Also, when the arc has been terminated at the end of a read-out cycle, means are provided to operate a ratchet relay for effecting a capacitor-interchange function of the capacitors of the integrators.

In the production of uranium materials for nuclear applications, a knowledge of the concentrations of a number of impurity elements is essential. In the past a commercially built spectrochemical instrument known as a "Quantometer" has been used for the reliable and economical method for the routine determination of as many as nineteen impurities. Although this commercial instrument provides a rapid means for obtaining the type of analytical data required, it nevertheless became more and more difficult to cope with increasing routine sample loads.

The above commercial system required the services of two operators, one for striking the arc and, after an exposure, for changing the electrodes in the arc stand while the second operator recorded the data from this exposure. Also, during routine analysis, only one of a pair of capacitors in each integrator unit was used to receive a charge from an associated photomultiplier in the spectrometer unit. The other capacitor could be and was used for calibration purposes when such was desired.

With a knowledge of operational limitations of the above system, the present modification of this system was designed such that only one operator is required and both capacitors in the integrator units are used to good advantage in a manner to be described below.

Accordingly, it is a primary object of this invention to provide an improved quantometer in which only a single operator is reqiured to carry out the operation thereof.

It is another object of this invention to provide an improved quantometer in which one set of capacitors (charged from a previous exposure) are read out while at the same time another set of capacitors are receiving a charge from a current exposure.

These and other objects and advantages of this invention will become apparent from a consideration of the following detailed specification and the accompanying drawings, wherein:

FIG. 5 is a wiring diagram of the ratchet relay control which controls the capacitor interchange of the integrators of FIG. 1;

FIG. 5A is a schematic showing of a part of the chart recorder illustrating the relationship of the recorder drum to the horizontal aperture of a mask attached to the recorder;

FIG. 6 is a wiring diagram of the chart drive automatic reset system of FIG. 1;

FIG. 7 is a wiring diagram of the effective connections to the integrating capacitors when relay RY–5 of FIG. 3 is de-energized;

FIG. 8 is a wiring diagram of the effective connections of the integrator units when relay RY–5 of FIG. 3 is energized for "No-SCARFU" operation;

The term "SCARFU," mentioned above, is an acronym which is taken to mean, "Simultaneous Charge and Read Function Unit." The commercial quantometer that was modified to accomplish the above objects was an IRQ–5, Model 8200, manufactured by Applied Research Laboratories, Inc., of Glendale, Calif.

The above objects have been accomplished in the present invention by a rewiring of each of the integrator units in such a manner as to permit the accumulated charge in respective ones of respective pairs of capacitors in each integrator (charged from a previous exposure from the arc stand) to be sequentially read out, while at the same time permitting charging of respective others of the respective pairs of capacitors in each integrator from a current exposure from the arc stand. Also, means are provided to start a recorder drum rotation in step with the channel stepping system and for automatically returning the recorder drum scale to its home position. In addition, means have been provided for automatically striking the arc of the arc stand during the read-out cycle of previously charged capacitors in the integrator units, for suppressing the full-scale arc termination function of the recorder pen carriage until after the element read-out cycle has been completed, and for terminating the arc and discharging the integrator capacitors which have just been read out when the channel-stepping system has been returned to the "home" position. Also, when the arc has been terminated at the end of a read-out cycle, means are provided to operate a ratchet relay for effecting a capacitor-interchange function of the integrators.

Figure 1:
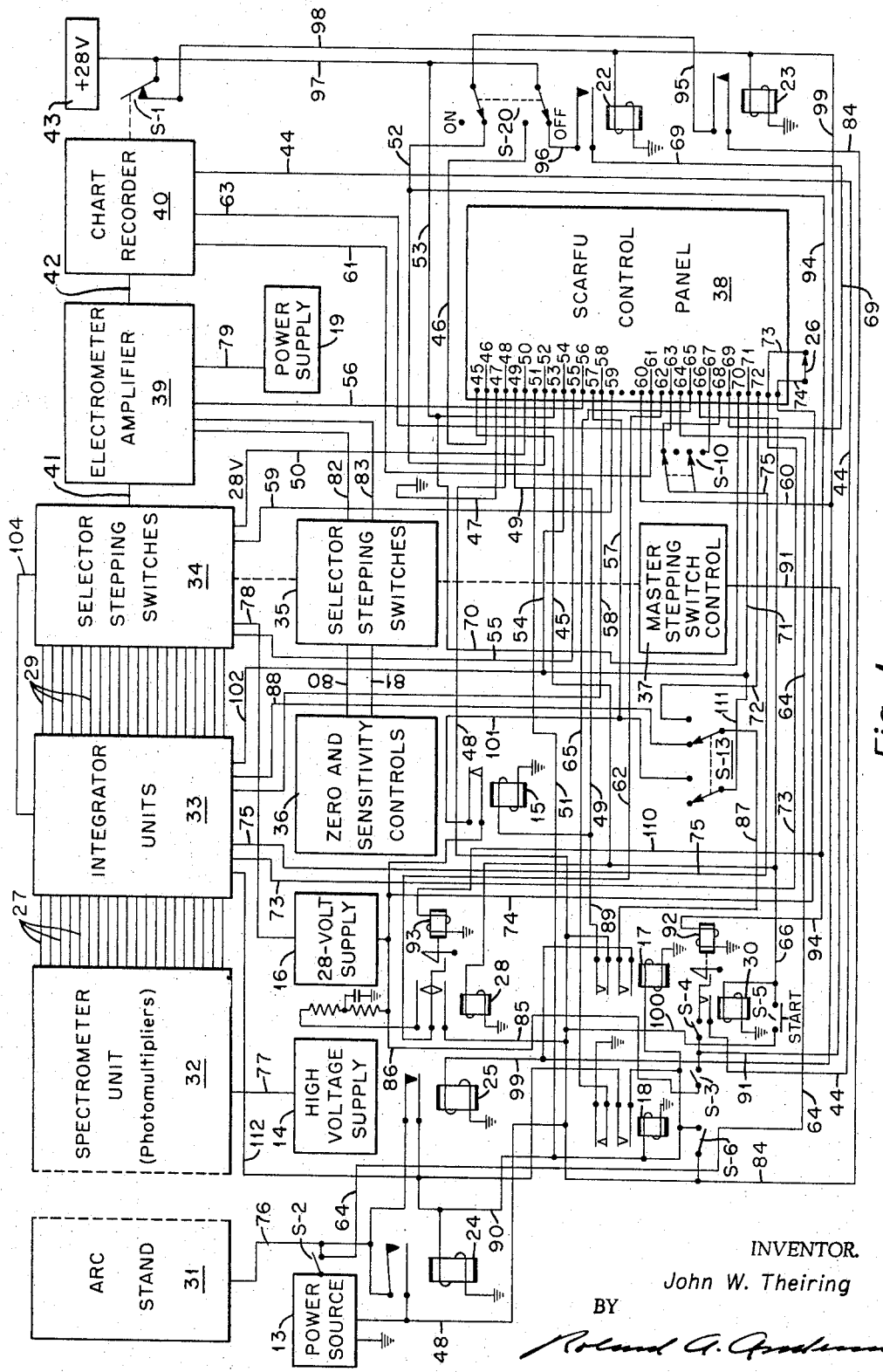
FIG. 1 is an overall schematic diagram of the modified quantometer.
Figure 3:
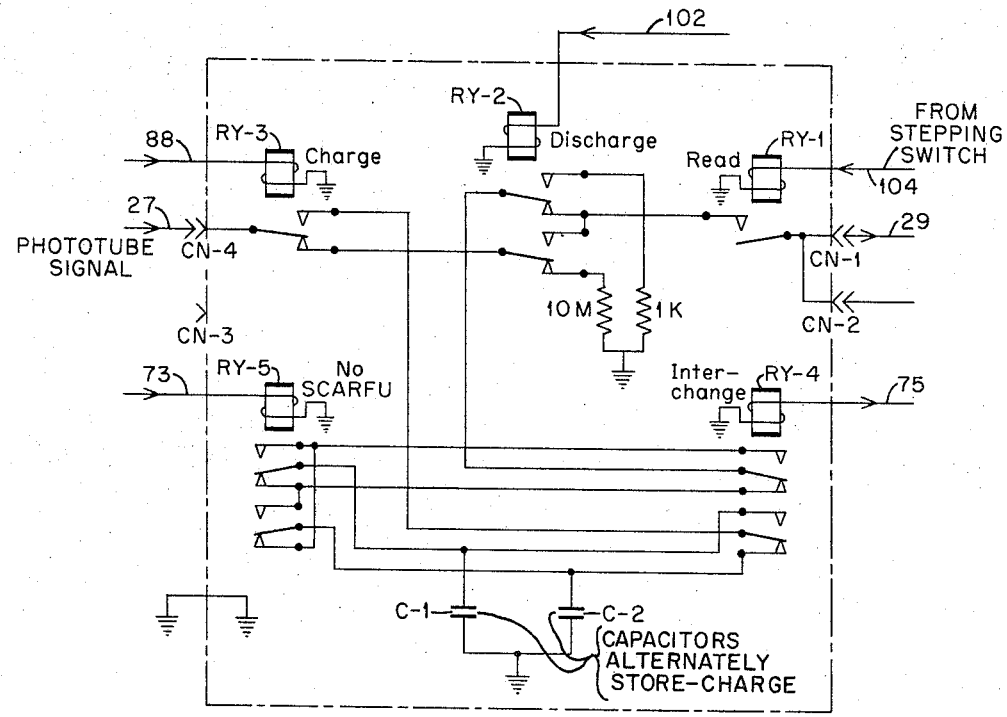
FIG. 3 is a wiring diagram of the integrator units of FIG. 1.
Figure 4:
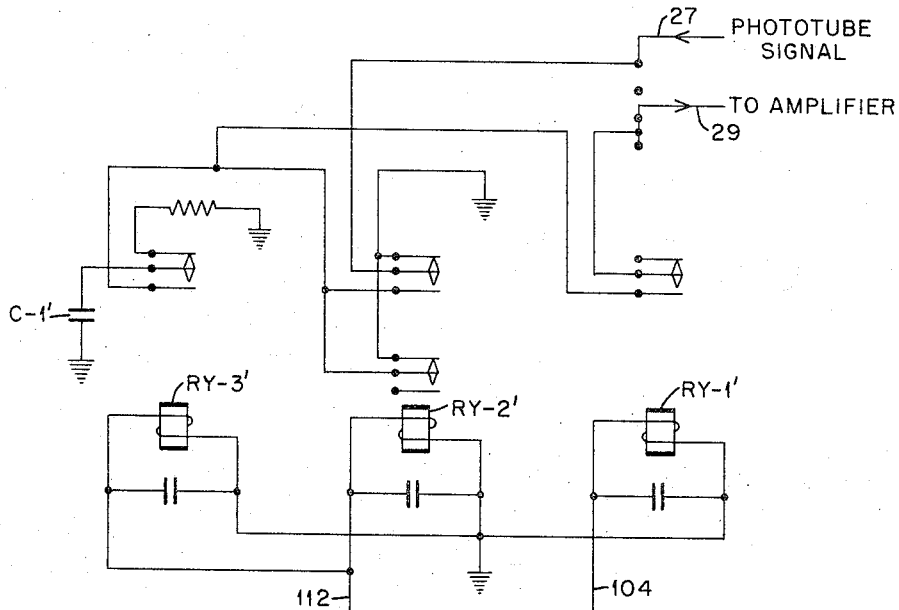
FIG. 4 is a wiring diagram of the internal standard integrator unit of FIG. 1.

Referring now to the drawings, in FIG. 1 an arc stand 31 is mounted near one end of a spectrometer unit 32. The arc stand 31 is provided with means for establishing an arc discharge. The sample material to be analyzed is exposed to the discharge to form a plurality of spectral lines, one for each of the impurity elements in the sample material. Inside the spectrometer housing 32 are mounted a concave grating and a plurality of semi-fixed multiplier phototubes, each of which is precisely positioned to intercept a selected spectral line from the arc stand 31. Individual signal cables 27 from the phototubes terminate in the integrator units housing 33 of 20 integrator units. One integrator unit is an internal standard unit and the other 19 units are used for determining the concentrations of the impurities in the sample being analyzed, depending upon the number of impurities present in the sample. Thus, it can be seen that the concentration of 19, or less, impurities in the sample material can be determined. The circuit details of one of the 19 integrator units is shown in FIG. 3, and the circuit details of the internal standard integrator unit is shown in FIG. 4, which will be described below.

In FIG. 1, the output lines 29 from the respective integrator units are sequentially connected by means of a selector stepping switch of the switches 34 to an electrometer amplifier 39 by means of a lead line 41. Also, the read relays (RY-1 of FIG. 3) of the integrator units are sequentially connected to a 28-volt supply 16 by means of a lead 78, another selector stepping switch of the switches 34 and a lead 104 (only one of which is shown), such that when the output line 29 of a given integrator unit is connected to the line 41, the read relay of this same integrator unit is energized by the supply 16. The amplifier 39 is connected to a power supply 19 by means of a lead 79.

The output of amplifier 39 is connected to a chart recorder 40 by means of a lead line 42. The output of the amplifier 39 is made to fall within the 0-50 millivolt range of the chart recorder regardless of the rather wide variation in voltage levels represented by the charges in the various integrator units, and this is accomplished by means of a separate pair of "zero" and "sensitivity" controls for each element channel. The zero and sensitivity controls 36 are sequentially connected by means of leads 80, 81, selector stepping switches 35, and leads 82, 83 to amplifier 39, such that the proper pair of zero-sensitivity controls for each channel are connected into the measuring circuit. The settings of these controls are established for each element channel during periodic calibrations of the system.

The stepping switches 34 and 35 are coupled to a master stepping switch control unit 37. Step pulses are supplied to the unit 37 by means of a lead 91 which is connected to a junction point between manual switches S-3 and S-4. The switch S-3 is connected by a lead 86 to the 28-volt supply 16 and is used for manual stepping of the switches 34 and 35. The switch S-4, when closed, provides step pulses from the recorder 40 by means of line 44, the contacts of relay 30, switch S-4 and line 91 to the control unit 37. Relay 28 is connected in parallel with relay 30 and both these relays are energized when a read-out cycle is initiated. Relays 28 and 30 are energized by a start switch S-5 when more than 12 elements are to be read out, and they are energized by a line 66 from the contacts of relay 10 (FIG. 2) when less than 12 elements are to be read out and the arc in the arc stand 31 is started manually. When more than 12 elements are to be read out, the arc is started automatically by a delay fire circuit to be described below.

When the start switch S-5 is closed to start a read-out cycle, power from a source 13 is connected by means of line 66, line 48, line 100 and switch S-5 to the coils of relays 28 and 30. The lower contacts of relay 28 and the contacts of relay 30, when closed, are held closed by latching relays 93, 92 respectively. The now closed lower contacts of relay 28 provide a power connection from source 13, lines 48 and 85, these lower contacts of relay 28, line 62, through the lower closed contacts of relay 9 (FIG. 2), and line 63 to the chart drive motor 107 of recorder 40 (see FIG. 6). When the motor starts to rotate, cam 105 (FIG. 6) permits the microswitch 108 associated therewith to close and when closed supplies 115 volts A.C. to the coil of relay 9 (FIG. 2) by means of a line 61. When relay 9 is energized, the chart drive motor 107 is then supplied 115 volts A.C. from a line 48 and through the upper contacts of relay 9. The motor 107 will continue to rotate until the microswitch 108 is again opened by the cam 105 when a read-out cycle of all the integrators is completed. This arrangement is provided so that it would not be necessary for the operator to manually return the recorder drum 114 (FIG. 5A) to its starting position before the beginning of the next read-out cycle.

With the contacts of relay 30 now closed and switch S-4 closed, the step pulses provided by the contacts 109 (FIG. 6) are fed to the control unit 37, in the manner indicated above, such that the selector switches 34, 35 rotate in step with the recorder drum of the chart recorder 40. As shown in FIG. 6, cam 106, driven by the motor 107, periodically closes the contacts 109 associated therewith to provide the above-mentioned step pulses.

The photomultipliers of the spectrometer unit 32 are connected to a high voltage supply 14 by means of a lead 77. The arc in the arc stand 31 is ignited either manually by a switch S-2 connected to the power source 13, or automatically by the contacts of an arc ignite relay 24, connected to the power source 13 in a manner to be described below.

The microswitch S-1 (FIG. 1) is normally closed and is opened mechanically by the recorder 40 only when the pen carriage reaches the upper end of the recorder scale. The analytical results from each integrator are visually and sequentially read from the chart recorder, FIG. 5, and recorded by an operator. The recorder was modified so that it is used as an indicating rather than a recording device. A strip of clear plastic having a vertical scribed line is attached to the pen carriage from which the pen was removed. A series of element concentration scales corresponding to analytical curves, are semi-permanently attached to the recorder drum. The rotation of the drum is synchronized with channel stepping, as set forth above, in such a manner that when a given element channel is being measured the proper element concentration scale appears in the horizontal aperture of a mask which is attached to the recorder. A typical concentration scale (for iron) is shown in FIG. 5.

Figure 2:
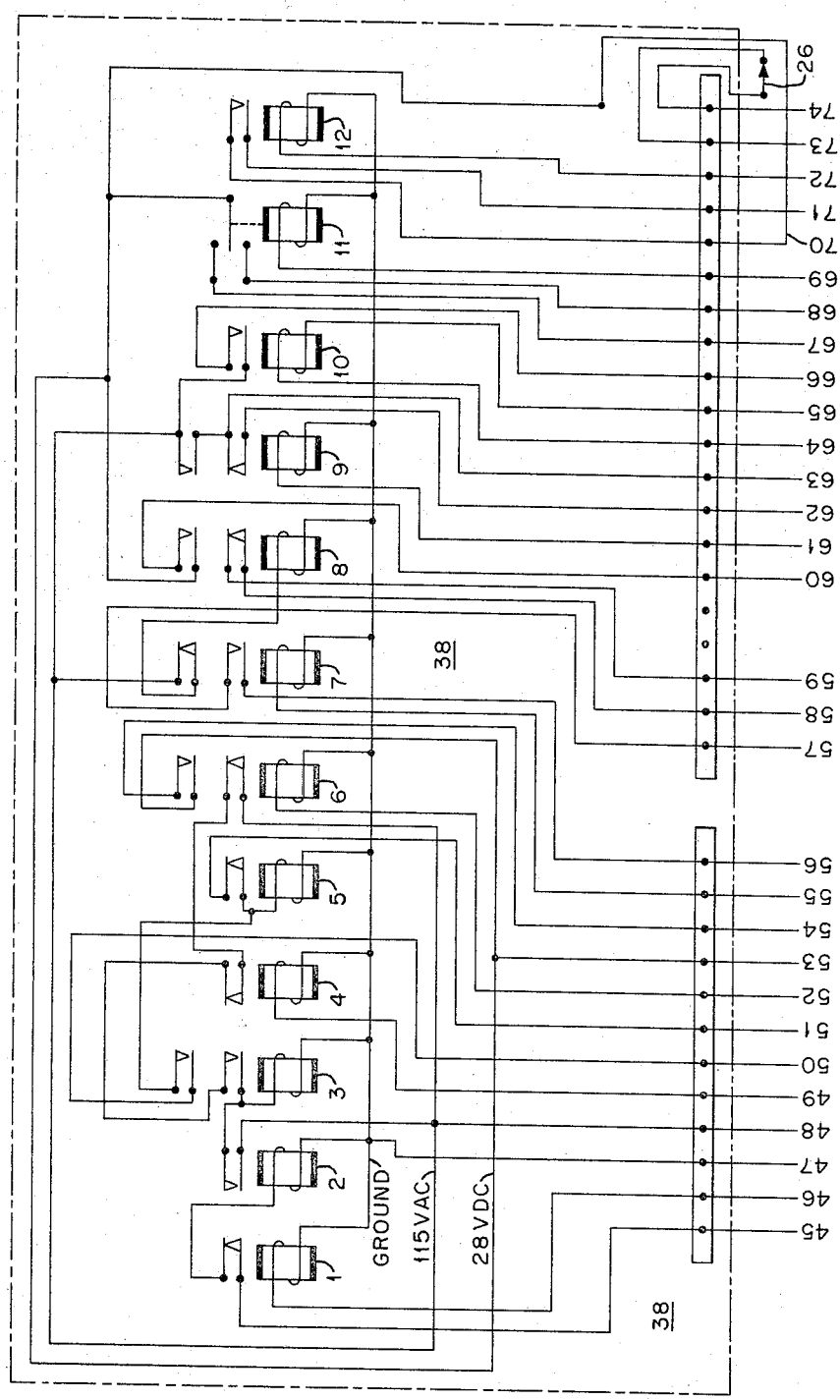
FIG. 2 is a wiring diagram of the SCARFU control panel of FIG. 1.

Referring back to FIG. 1, when the switch S-1 is closed, a circuit is completed from the 28-volt D.C. source 43, through switch S-1 and lead 98 to the coils of relays 22 and 23, and then lead 99 (connected to lead 98) is connected to the coil of relay 25 and to the first contact arm of relay 17. Thus, when the switch S-1 is closed, the relays 22, 23 and 25 are energized. The contacts of relay 25 provide a holding circuit for the arc ignite relay 24 when the latter relay is energized in a manner to be described below. The contacts of relay 22 close when this relay is de-energized at the end of a read-out cycle which then provides a circuit from the source 43, lead 97, one pair of contacts of a recycle switch S-20 in the off position lead 96, contacts of relay 22, and lead 69 to the coil of ratchet relay 11 (FIG. 2, FIG. 5). The other side of relay 11 is connected to a ground lead 47, in the SCARFU control panel 38. It should be noted that relays 1 through 9 and 12 of the control panel 38 are also connected to the ground lead 47. The contacts of relay 23 which are closed when this relay is deenergized at the end of a read-out cycle provides a circuit from power source 13, lead 48, lead 84, the contacts of relay 23, lead 95, the other pair of contacts of switch S-20 in the off position, and leads 52, 94 and 110 to the coils of relays 92 and 93. Relays 92 and 93, when energized, unlatch the contacts of relays 30, 28, respectively, and this occurs at the end of a read-out cycle. The contacts of relay 23, when closed, also connect the power line 84 to the lead 95, the other pair of contacts of recycle switch S-20 in the off position, and lead 52 to the coil of relay 6 in the control panel 38 (FIG. 2). When relay 6 is energized, at the end of a read-out cycle, the upper contacts of this relay are closed to connect the 28-volt D.C. line 53 to a lead 54 which is connected to the lead 102 (FIG. 1) which is connected to the discharge relays RY-2 of the 19 element integrator units in the panel 33, the wiring diagram of one of these units being shown in FIG. 3. The lower contacts of relay 6 (FIG. 2), when opened, break a holding circuit for relay 3, which relay is energized in a manner to be described below.

Before a read-out cycle is begun, relay 15 (FIG. 1) is de-energized and the contacts of this relay connect the 28-volt D.C. supply 16 to a lead 101, which is connected to a lead 57. Lead 57 is connected to lead 56 through the lower contacts of relay 7 (FIG. 2) which are closed when relay 7 is energized. Relay 7 is energized only when the stepping switches 34 are in the home position by a lead 55 from the switches to the coil of relay 7. Lead 56, from the lower contacts of relay 7, is connected to a grounding relay in the amplifier 39. Thus, when relay 7 is de-energized when the stepping switches 34 move from their home position at the starting of a read-out cycle, the lower contacts of this relay open to open the circuit of the grounding relay in amplitfier 39, and the upper contacts of this relay close to provide a circuit from the 115-volt A.C. line 48, through these upper closed contacts to the coil of relay 8 and then to ground lead 47. Thus, relay 8 remains energized during the complete read-out cycle until the stepping switches 34 return to their home position at the end of a read-out cycle to again energize relay 7.

After relay 8 (FIG. 2) is energized, the upper contacts of this relay close. A circuit is then completed from the 28-volt D.C. line 53, through the upper contacts of this relay 8, and line 60 which is connected to line 99 in the coil circuits of relays 22, 23 and 25. Thus relays 22, 23 and 25 are kept energized during a read-out cycle even if the switch S-1 is momentarily opened during the read-out cycle. Therefore, this alternate circuit to the coils of relays 22, 23 and 25 insures that the full-scale arc termination function of the recorder will be suppressed at all times except when the channel stepping system is in the home position. This alternate circuit for relays 22, 23 and 25 is essential since it is not uncommon to encounter impurity element concentration large enough to drive the recorder full-scale during the read-out cycle. Thus, a premature termination of the arc exposure during a read-out cycle is prevented, and also the relays 22, 23 are prevented from prematurely actuating the integrator capacitor interchange function and the unlatching functions of relays 92, 93, respectively, during a read-out cycle.

The relationships between the full-scale microswitch S-1 of recorder 40, the recycle switch S-20, relay 22, relay 11, and the switch S-10 are more clearly seen in FIG. 5. At the end of a read-out cycle, with the stepping switches in the home position, the internal standard integrator unit is switched into the measuring circuit and, when the full-scale microswitch S-1 is opened thereby, relay 22 is then de-energized (since the alternate circuit to relay 22 discussed above is now opened). Then the contacts of relay 22 close to energize the ratchet relay 11. Relay 11 will then connect lead 53 (from source 43) either to lead 68 or 67, depending upon the position of the center arm of the ratchet when relay 11 is energized. The switch S-10 is normally in the position shown in FIG. 5 and connects the lead 68 to a lead 75 which is connected to the integrator capacitor interchange relay (RY-4) of all the 19 element integrator units, such that all of these integrator relays (RY-4) are either energized or de-energized depending upon the position of the center arm of the ratchet of relay 11. The switch S-10 was used in the original commercial quantometer as an "analyze," "calibrate" switch when only one of the capacitors of the integrator units was used in a routine analysis. It can be seen, however, that this switch S-10 in the present system can be used to duplicate the function of ratchet relay 11, if such is desired.

Switch S-13 (FIG. 1) is a profile control switch. During an analytical cycle this switch is in the position shown in FIG. 1. When the arc in the arc stand 31 is started (either manually or automatically) the relays 17 and 18 are then actuated along with the relay 24 and maintained actuated during a read-out cycle. The contacts of relay 17 are closed when this relay is energized. The lower contacts of relay 17 complete a circuit from the power line 60 (during the read-out cycle) and lead 99 to lead 87. Lead 87 is in turn connected through one pair of contacts of the switch S-13 (in the position shown which is the analyze position) to a lead 88. Lead 88 is connected to the charge relays (RY-3) (FIG. 3) of the 19-element integrator units in the panel 33. Thus, when the arc is ignited and relay 17 is energized, the charge relays (RY-3) in the 19 element integrator units are energized. The upper contacts of relay 17, when closed, complete a circuit from source 13, and lead 48 to lead 89. Lead 89 is in turn connected to relay 15 and by a lead 49 to relay 4 (FIG. 2) in the SCARFU control panel 38. The function of this relay 4 (FIG. 2), when energized after the source is in operation and the arc is ignited, is to suppress the "delay" ignition function of relay 5 (FIG. 2). This suppression is desired when the arc is started manually by the switch S-2.

Relay 10 of the control panel 38 is energized only when it is desired to start the arc in arc stand 31 manually by the switch S-2. When switch S-2 is closed, momentarily, a circuit is completed from source 13, to lead 76 which energizes the arc in arc stand 31. Also, a circuit is completed from source 13, switch S-2, the closed contacts of relay 25 to the coils of relays 17, 18 and 24 which are then maintained energized by a holding circuit from source 13, the contacts of relay 24 and the contacts of relay 25, such that relays 17, 18 and 24 are maintained energized until the end of a read-out cycle when the relay 25 is de-energized. In addition, another circuit is completed by switch S-2, when closed, from source 13 to a lead 64 which leads to the coil of relay 10 (FIG. 2). The other side of relay 10 is connected by a lead 65, and the upper closed contacts of relay 18 to ground. When relay 10 is energized the contacts thereof complete a circuit from the 115-volt A.C. line 48 to the lead 66, and lead 66 is connected to the coils of relays 28, 30. The functions of relays 28, 30, when energized, have been described above. Thus, it can be seen that these relays 28, 30 can be energized either by the start switch S-5 or by energization of the relay 10 in the panel 38. In either case, the recorder drum of recorder 40 is started rotating and step-pulses from the recorder are fed to the switch control 37 in the manner set forth above. Relay 18 is designed such that there is a slight delay in opening its normally closed upper contacts in the ground circuit for relay 10 such that relay 10 will cause energization of relays 28 and 30 before the circuit for relay 10 is broken.

When the arc is automatically ignited during a read-out cycle of the previously charged capacitors in the 19 element integrator units, which is desired when more than 12 elements are to be determined, the relays 17, 18 and 24 are energized by the following circuit. When a circuit is completed to the coil of the .5-sec. delay relay 5 (FIG. 2), an alternate circuit is completed through the contacts of relay 5, lead 51 and lead 90 to the coils of relays 17, 18 and 24 which are maintained energized by a holding circuit described above. Now, the relay 5 is energized in the following manner. Relay 3 (FIG. 2) has to be energized before relay 5 can be energized. Relay 3 can be energized only when relay 1 is de-energized and relay 2 is energized. Relay 1 is de-energized at all times unless it is desired to repeat the readout cycle of a given exposure in which case the recycle switch S-20 (FIG. 1) is put in the "on" position. With the switch S-20 in the "on" position, a circuit is completed from source 43, lead 97, switch S-20, lead 46 to the coil of relay 1 (FIG. 2). With relay 1 energized, this suppresses the energization of relays 2, 3 and 5 such that the delay fire circuit for the arc ignition circuit cannot be again completed during the recycle period. In this case, the recycle switch must be put in the "on" position just *before* the termination of the current exposure in order to prevent loss of the charges from the previous exposure by the automatic discharge function at the end of the current read-out cycle. Thus, when the switch S-20 is in the "on" position, the connections to relay 6 by lead 52 and to relays 92 and 93 by leads 94 and 110 are broken by this switch in this position, such that the relay 6 cannot be energized to actuate the discharge relays in the integrator units, and relays 92 and 93 cannot be energized to stop the channel stepping function, and, after the read-out cycle is repeated to the extent desired, the switch S-20 is then manually returned to its normal "off" position.

Since relay 1 (FIG. 2) is normally de-energized (except during a recycle operation as described above), the normally closed contacts of this relay are in the coil circuit of relay 2. Relay 2 is energized when either switch S-5 (FIG. 1) is closed or when relay 10 (FIG. 2) is energized, as described above, and power is then supplied over either line 100 or line 66 to line 45 leading to relay 2 through the contacts of relay 1. When relay 2 is energized, it closes its contacts which connect the power line 48 to the coil of relay 3. Relay 3, when energized, then closes both its pairs of contacts. The lower contacts of relay 3 provide a holding circuit for this relay through these contacts, the contacts of relay 4 and the lower contacts of relay 6 to the 115-volt A.C. line 48. This holding circuit for relay 3 is necessary since relay 2 is energized only momentarily. It should be again noted that relay 4 is energized when the arc is started manually as discussed above, such that the relay 3 cannot be maintained energized by its holding circuit, and thus relay 4 suppresses the delay, arc ignition function of relay 5 which is desired since the arc is already in operation. Also, when relay 6 is energized at the end of a read-out cycle, as discussed above, the lower contacts of this relay break the holding circuit for relay 3.

The upper contacts of relay 3, when closed upon energization of this relay, connect a line 50 to the coil of relay 5 and to the closed contacts of relay 5. Lead 50 is connected to a selected contact of one of the stepping switch banks of the switches 34 depending upon when, during the read-out cycle, the arc is to be started. This selected contact (which may be the seventh step, for example) is connected to a 28-volt D.C. supply through the stepping switch arm such that, when this contact is reached by the stepping switch arm, the 28-volt D.C. supply is connected to line 50 to thus energize relay 5 (FIG. 2). Relay 5 is a 0.5-sec. delay relay such that when power is connected to the line 50, a circuit is completed from line 50, the upper contacts of relay 3, the contacts of relay 5, and line 51 to the coils of relays 17, 18 and 24. As pointed out above, these latter relays 17, 18 and 24 are maintained energized by a holding circuit through the contacts of relays 24 and 25, such that when the contacts of relay 5 open after a 0.5-sec. delay, the relays 17, 18 and 24 will not become de-energized. The automatic delay fire circuit described above is desirable when more than 12 elements are to be determined since the read-out time would exceed the "burn" time for the sample element if the arc were ignited at the beginning of a read-out cycle. By actuating the arc igniting circuit by the relay 5 at a selected time during the read-out cycle (the seventh step, for example) insures that the channel stepping system will return to the home position at least a few seconds before the capacitor of the internal standard integrator has accumulated a charge equivalent to a full-scale deflection of the recorder. Thus, this delay fire circuit insures that the read-out cycle from the preceding exposure would always be completed well before the time for the termination of the current exposure by the internal standard integrator. Therefore, when the stepping switches have returned to the home position and the internal standard integrator is connected into the measuring circuit, the recorder then monitors the last few seconds of charge accumulation in this integrator and terminates the exposure when the switch S-1 is open in a manner previously described.

Figure 9:
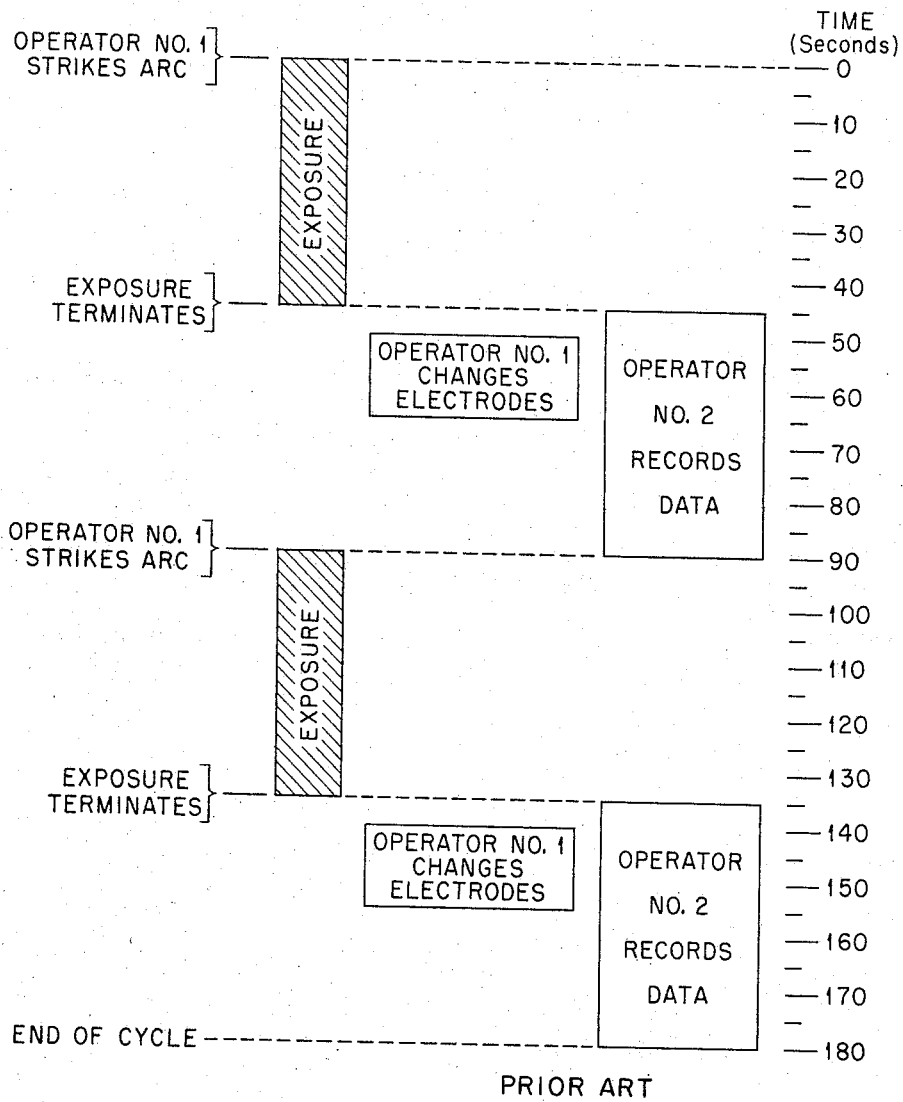
FIG. 9 is a diagram showing an analytical cycle for the operation of the conventional quantometer.
Figure 10:
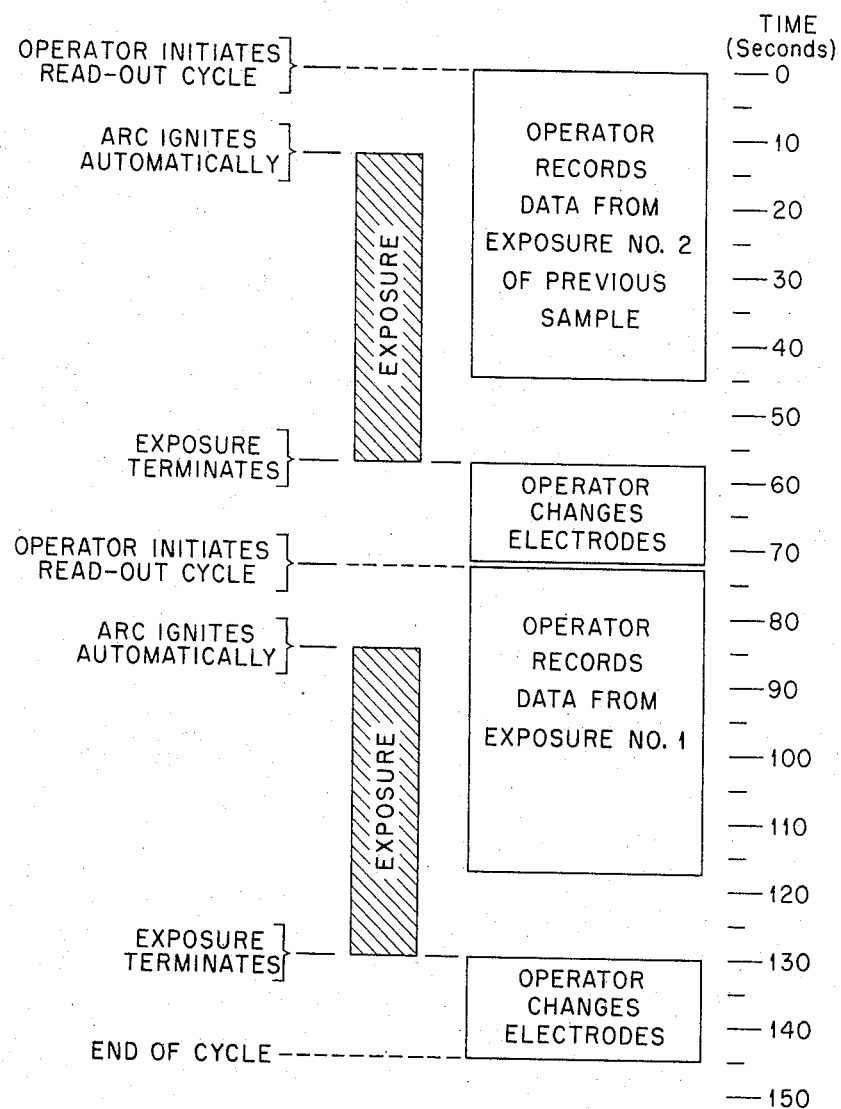
FIG. 10 is a diagram showing an analytical cycle for the modified quantometer of the present invention.
Figure 11:
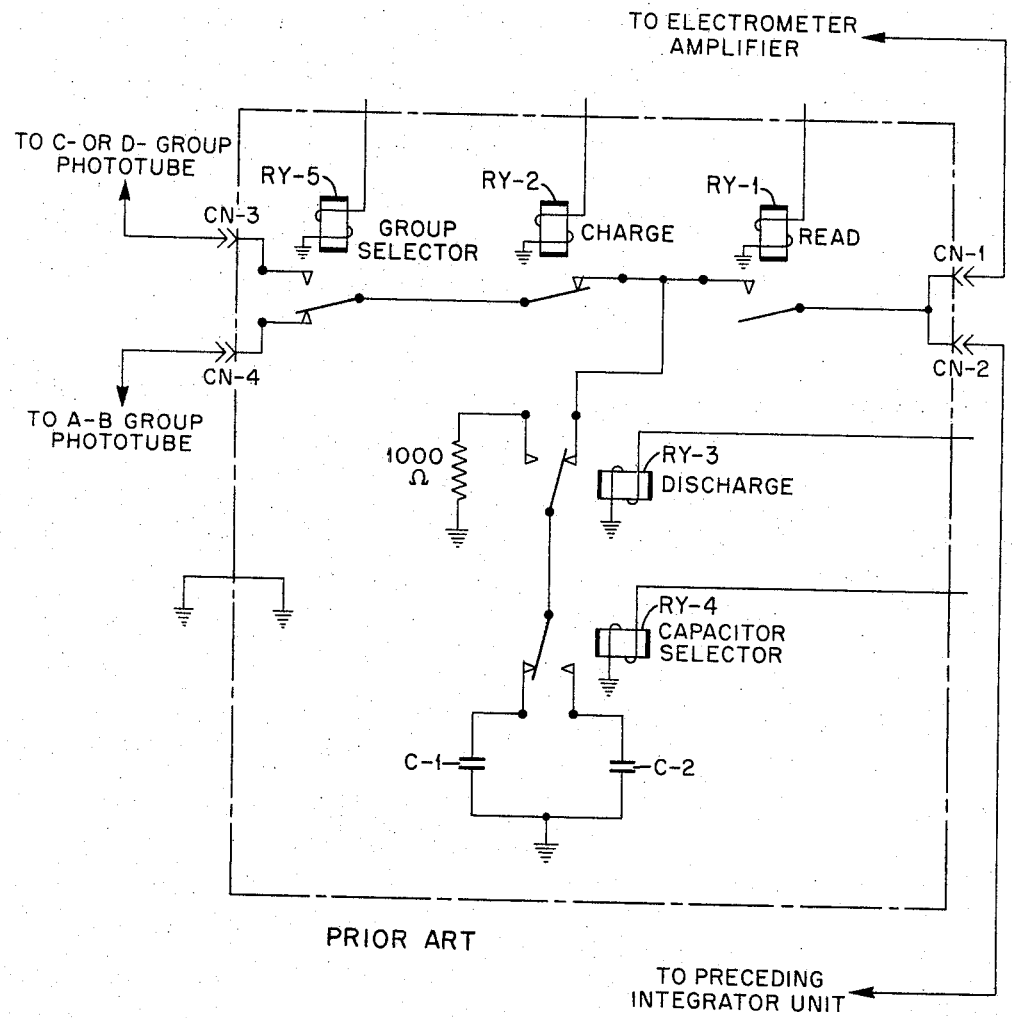
FIG. 11 is a wiring diagram showing the original circuit of the integrator units as used in the prior commercial system aforementioned.

As set forth above, there are 19 element integrator units and one internal standard integrator unit in the panl 33. All of the 19 integrator units are wired in an identical manner, and FIG. 3 shows the wiring diagram of one of these unit. It should be noted that the wiring diagram of FIG. 3 of the present invention is substantially different from the wiring diagram of the integrator units of the prior commercial system, aforementioned. FIG. 11 shows the wiring diagram of the element integrator units of this prior commercial system. It can be seen from a comparison between FIG. 3 and FIG. 11 that the relay RY-5 of FIG. 11 serves a different purpose than does the relay RY-5 of FIG. 3 (to be described below), and in FIG. 11 the relay RY-4 is normally de-energized for a plurality of routine analysis of a plurality of sample materials, while in FIG. 3 the relay RY-4 is used to perform a capacitor interchange function at the end of each read-out cycle in a manner to be described below. It was determined that the use of the capacitor C-2 of FIG. 11 in the commercial system for calibration purposes was not necessary and was not used for routine analysis, such that the present invention was conceived by rewiring the relays of FIG. 11 in the manner indicated in FIG. 3 so that the capacitors C-2 of the element integrator units could be charged by a current arc exposure of a sample element, while the charges accumulated on the capacitors C-1 (charged by a previous arc exposure) could be read out and the function of these capacitors being reversed for the next read-out cycle in the manner indicated below, thus increasing the number of samples that could be analyzed in a given time interval. For example, the maximum capability of the prior commercial system with two operators working 8 hours was 180 samples. With the present SCARFU system, utlizing the modified integrator units of FIG. 3, the maximum capability of the present system with only one operator working 8 hours is 240 samples. A comparison between typical analytical cycles of both systems can be seen from the operation diagrams of both systems as shown in FIG. 9 and FIG. 10, to be described below. FIG. 4 shows the wiring diagram of the internal standard integrator unit which is switched into the measuring circuit of FIG. 1 when the last of the 19-element integrator units has been read and the stepping switches have returned to the home position.

In FIG. 3, a charge relay RY-3 is energized by the line 88 when the arc is ignited and relay 17 is energized (as described above in FIG. 1) and this relay (RY-3) is maintained energized until the read-out cycle of all the integrators is completed and when the relay 17 is de-energized. Thus, all the charge relays (RY-3) of the 19 element integrator units are maintained energized by the preceding described circuit since the line 88 is connected to all of these relays in these units.

The discharge relays (RY-2, FIG. 3) of all the 19 integrator units are connected to a lead 102, and these relays are energized at the end of a read-out cycle when relay 6 of the control panel 38 is energized in the manner described above. Thus, relays RY-2, when energized, connects the capacitors, which have just been sequentially read, to a discharge circuit for these capacitors.

The relays RY-5 of the 19-element integrator units are all connected to a lead 73 which is connected by a switch 26 to a lead 74 (FIG. 1), and lead 74 is connected to the 28-volt D.C. supply 16. The switch 26 is normally open and the relays RY–5 of the integrator units are normally de-energized. The relays RY–5 are energized only if it is desired to sequentially connect the signals from the photomultipliers directly into the measuring circuit for the purpose to be described below.

The relays RY–4 (FIG. 3) of the 19 element integrator units are all connected to the line 75. The 28-volt D.C. source 43 (FIG. 1, FIG. 5) is or is not connected to the line 75 through switch S–10 depending upon the position of the ratchet arm of the relay 11, such that the ratchet arm completes the circuit to line 75 during one read-out cycle and brakes the circuit to line 75 during the next read-out cycle. In other words, when the relay 11 is energized at the end of each complete read-out cycle, the ratchet arm of this relay is moved to its other position and remains there until the relay 11 is again energized at the end of a subsequent read-out cycle. Thus, the relays RY–4 (FIG. 3) of the 19 integrator units are either energized or de-energized during the respective complete read-out cycles. These relays RY–4 are the capacitor interchange relays. FIG. 7 shows the effective connections to the integrating capacitors C–1 and C–2 (FIG. 3) when the relay 5 is de-energized. It can be seen that, for one position of the contacts of relay RY–4, capacitor C–2 is receiving a charge from a current exposure over line 27 from its respestive phototube, while capacitor C–1, which was charged by a previous exposure, is connected to the output line 29 by way of the contacts of read relay RY–1 (FIG. 3) when this read relay is energized sometime during the read-out cycle. When the energized condition of relay RY–4 changes at the end of a complete read-out cycle, the connections to the capacitors C–1, C–2 are reversed by relay RY–4 after the charge on the capacitor C–2 (already read) has been discharged by the discharge relay RY–2, which occurs when the stepping switches return to the home position and the standard integrator is connected in the measuring circuit. Then, during the next read-out cycle, capacitor C–1 will receive a charge while capacitor C–2 is read out during this next read-out cycle.

The read relay RY–1 (FIG. 3) is connected by a lead 104 to a contact of one of the selector switches 34 (FIG. 1) and when the contact arm of the selector switch makes contact with this contact, a circuit is then completed to the supply 16 (FIG. 1) by way of lead 78. Thus, as the contact arm sequentially makes contact with the respective contacts of the selector switch, the supply 16 is sequentially connected to the read relays RY–1 of the integrator units over lines 104 (only one of which is shown in FIG. 1), and the charges on one of the capacitors of each integrator (charged by a previous exposure) are sequentially measured and read out.

As mentioned above, the relays of RY–5 of the 19-element integrator units are normally de-energized. It is, however, sometimes desirable, particularly in calibration of the instrument, to be able to observe the accumulation of a charge in a capacitor during an exposure by noting the movement of the recorder pen carriage, and it is when this is desired that the relays RY–5 are energized. FIG. 8 shows the effective connections to the integrating capacitors of FIG. 3 when the relay RY–5 is energized. Thus, from FIG. 8, it can be seen that, as a charge is accumulating in the capacitor C–2, this increasing charge is measured by the amplifier for the particular channel selected at the time. When the normally open switch 26 (FIG. 1) is closed, all the relays RY–5 in the 19 integrator units are energized in the manner indicated above and this places the system in a "No-SCARFU" condition. During the daily "profile" operation, now to be described, the photo tubes are re-adjusted to their optimum spectral positions. For this profile operation, the switch S–13 (FIG. 1) is moved to its other position than that shown in FIG. 1, and the relays 24, 28, 30, 15, 17, 18, 92 and 93 are all de-energized at this time. After the switch S–13 is placed in its profile position, a circuit is completed from source 16, the contacts of relay 15, lead 101, switch contacts of switch S–13, lead 111 and lead 102 to the discharge relays RY–2 of the integrator units. Then a switch S–6 is closed to energize the relays 17, 18 and 24 which are maintained energized by a holding circuit, previously described. The charge relays RY–3 of the integrators are not energized during the profile operation since the circuit 88 thereto is broken when the switch S–13 is in the profile position.

Now after relays 17, 18 and 24 are energized by closing of switch S–6, a circuit is completed from source 43, switch S–1, lead 98, lead 99, and through the lower contacts of relay 17 to the lead 87. Lead 87 is connected to lead 72 through the contacts of switch S–13 in the "profile" position, and lead 72 is connected to the coil of relay 12 in the control panel 38 (FIG. 2). When relay 12 is energized by the preceding described circuit, its contacts complete an alternate power circuit to lead 102 leading to the discharge relays RY–2 in the integrators, since the first described power circuit to lead 102 is broken at the contacts of relay 15, which relay is energized by the upper contacts and energized relay 17 in a manner previously described. This alternate circuit to lead 102 is as follows: source 43, lead 97, lead 53, lead 70, through the contacts of relay 12 (FIG. 2) lead 71 to the lead 102 (FIG. 1). Thus, the discharge relays RY–2 are kept energized during the "profile" operation.

Simultaneously with the closing of switch S–6, the start switch S–5 is closed to start the chart drive motor and the channel stepping as previously described.

During the "profile" operation, when the integrator charge relays RY–3 are de-energized and the integrator discharge relays RY–2 are energized, in the manner described above, it can be seen from FIG. 3 the phototube signal from lead 27 is connected through the lower contact position of relay RY–3, through the contacts of relay RY–2 in their other position, then directly to the contacts of the read relay RY–1, such that when the integrator units are sequentially switched into the measuring circuit, the phototubes can then be sequentially adjusted to their optimum spectral positions.

FIG. 4 shows the wiring diagram for the internal standard integrator unit in the panel 33 of FIG. 1. This unit is provided with three relays, a charge relay RY–3', a discharge relay RY–2' and a read relay RY–1'. The relays RY–2' and RY–3' are connected to a common line 112 which is connected to line 90 (FIG. 1) such that these relays are energized when power is supplied to the arc ignite relay 24 (by the line 90 in the manner previously described). When relays RY–2' and RY–3' are energized their center contact arms move to their other position than that shown in FIG. 4 such that the capacitor C–1' will receive a charge over a line 27 from its associated phototube through the contacts of these relays. When relay RY–1' is energized at the end of a read-out cycle, when the stepping switches are in their home position, the capacitor C–1' is connected to the output line 29 through the contacts of relays RY–3' and RY–1'. At the end of a read-out cycle, when the holding circuit for relay 24 is broken in a previously described manner, power is also disconnected from line 112 and relays RY–2' and RY–3' will then be de-energized to immediately discharge the capacitor C–1', such that this capacitor will then be ready to receive a charge from the next arc exposure.

When the capacitor C–1' is connected to the measuring circuit and, when the pen carriage of the recorder 40 reaches the upper limit of the recorder scale, the switch S–1 is opened to (1) terminate the arc; (2) to break the holding circuit for relays 17, 18, 24, RY–2' and RY–3'; (3) to energize the relays 92, 93 to thus stop the channel stepping and movement of the chart recorder drum; (4) to energize the relay 6 to discharge the capacitors already read out of the 19 element integrator units; and (5) to actuate the ratchet relay 11 to effect the capacitor interchange function of the relays RY-4 of the 19 element integrator units, all in a manner previously described.

In the beginning of operation of the device of FIG. 1, when all the step switches are in the home position, and there are no charges on any of the capacitors of the integrator units, the start button S-5 is pushed to initiate the arc pre-integration period. At the end of a predetermined time period, as previously discussed, the arc is ignited and the integration period begins for all the integrator units. At the end of the integration period when the stepping switches have returned to their home position and the standard integrator is switched into the measuring circuit to terminate the arc exposure and the channel stepping, the relays RY-4 of the 19 element integrator units are operated to effect their capacitor interchange function, such that the 19 integrator capacitors that have just received a charge from the first exposure of the first sample may then be read out during the next cycle when the second exposure of the first sample is initiated during which the other capacitors of the 19 integrator units are receiving a charge which are to be read out during the next cycle when the first exposure of the second sample is initiated. Thus, one of the capacitors of each of the 19 element integrator units (charged by a previous exposure) are read out while the other capacitor of each of these units is being charged by a current exposure. The magnitude of the individual charges in the integrating capacitors depend upon the corresponding element concentrations.

From the preceding discussion, it can be seen that each sample preparation is given two individual analyses. An approximate analytical cycle for each of these two analyses, as it was carried out under the mode of operation of the prior commercial quantometer, is represented in relation to the time scale in FIG. 9. In this prior mode of operation only one capacitor of each integrator was used, and it should be noted that two operators were used and that the "exposure" and "read-out" portions of the cycle were sequential. Although exposure times normally vary somewhat, the 45 seconds indicated is almost a minimum value so that the total time for a complete analytical cycle was at least 180 seconds, assuming that the maximum number of elements (19) was being determined.

An analytical cycle based on the use of the SCARFU modification of the present invention is shown in FIG. 10. A comparison of FIG. 10 with FIG. 9 will show that with the SCARFU system the sample-handling capability of the quantometer has been increased to approximately 124 percent of its original capacity. Also, due to the shorter elapsed analytical time and also due to the fact that only one operator is used in the SCARFU system, the number of operator man-hours required for the analysis of a given number of samples has been reduced to approximately 40 percent of the previous requirement.

The specific details of the arc stand 31, the spectrometer unit 32, the selector stepping switches 34, 35, the zero and sensitivity controls 36, the master stepping switch control 37, and the electrometer amplifier 39 are not believed necessary for an understanding of the present invention. All of these components are the same and function the same as for the commercial industrial research quantometer, Model 8200 (IRQ-5), aforementioned. It should be understood that the system shown in FIG. 1 and described above shows only those parts of the modified quantometer which are necessary for an understanding of the present invention. Other minor details, such as an alternate power supply for operating the system, for example, have not been shown since they were not considered necessary for an understanding of this invention.

This invention has been described by way of illustration rather than limitation and it should be understood that this invention is equally applicable in fields other than those described.

What is claimed is:

1. A spectrochemical analyzing system for measuring the individual concentrations of a plurality of impurity elements in each of a plurality of sample materials, comprising an arc stand; means for establishing an arc discharge within said stand, each of said sample materials being exposed to said discharge during respective analytical cycles, each of said samples when exposed to said discharge forming a plurality of spectral lines, one for each of the impurity elements in the sample being analyzed; a plurality of photomultipliers, each of which is precisely positioned to receive a selected one of said spectral lines; a plurality of element integrator units, each of said units comprising a pair of capacitors, a charge relay, a discharge relay, a read relay, and a double pole-double throw capacitor interchange relay; means for connecting the outputs from said photomultipliers through the contacts of the respective integrator charge relays and through one of the double throw contacts of the respective integrator interchange relays to thus charge one or the other of said pair of capacitors of each integrator unit, depending upon the energized state of said interchange relays; means for connecting one of said one and said other of said capacitors of each integrator unit, whichever ones are not receiving a charge at the time, through the other of the double throw contacts of the respective integrator interchange relays, depending upon the energized state of said interchange relays, and through the contacts of said discharge relays, when de-energized, and through the contacts of said read relays, when energized, to respective output lines, such that when the interchange relays are de-energized one capacitor of each integrator unit is receiving a charge from its respective photo-multiplier while the other capacitor of each integrator unit, charged by a previous exposure, is connected to its respective output line and when the interchange relays are energized the above-described connections to said capacitors being reversed; a 28-volt D.C. supply; a plurality of selector stepping switches; said D.C. supply being sequentially connected to the read relays of said integrator units by means of one of said stepping switches; an electrometer amplifier, said amplifier being sequentially connected to the output lines of said integrator units by means of another one of said stepping switches such that when the read relay of an integrator unit is energized, the output line of this integrator unit is connected to said amplifier; a chart recorder provided with an indicating meter and drum and a cam operated step pulse generator; the output of said amplifier being connected to said meter; a stepping switch control means connected to said stepping switches; motor means connected to said recorder drum; means for energizing said recorder motor means for initiating rotation of said recorder drum such that said recorder step pulse generator supplies step pulses to said stepping switch control means to rotate said stepping switches in step with the rotation of said recorder drum, said recorder drum being provided with a plurality of element concentration scales, each of said scales being brought sequentially into view as each associated integrator unit is switched into the recorder meter circuit, such that a visual indication of the concentration of each impurity element is sequentially provided by said meter; an internal standard integrator unit provided with a capacitor, a charge relay, a discharge relay and read relay, said standard unit capacitor receiving a charge from an associated photomultiplier during a current arc exposure and being switched into said meter circuit at the end of a read-out cycle after all of said element integrator units have been switched into said meter circuit and when the stepping switches have returned to their home position; said means for establishing said arc discharge comprising a power source, an arc ignite relay, and means for energizing said arc ignite relay at a selected time during said read-out cycle, said last-named means including further relay means for energizing said charge relays in said element integrator units, and energizing said standard integrator charge and discharge relays; said chart recorder further including a first microswitch which is connected in the circuit of said recorder drum motor means such that at the end of said read-out cycle when said drum and said stepping switches have returned to home position, said motor means circuit is broken by said first microswitch, thereby stopping said step-pulse generator and thus rotation of said selector switches, circuit means actuated by said stepping switches when they have returned to their home position at the end of a read-out cycle for connecting said discharge relays of said element integrator units to said D. C. supply whereby said capacitors just read are discharged upon energization of said discharge relays, said chart recorder further including a second microswitch which is opened when the recorder meter reaches full scale; a ratchet relay; and circuit means controlled by said second recorder microswitch, when opened by said recorder meter which is actuated to full scale by said internal standard integrator capacitor when said stepping switches and recorder drum are in their home positions, for terminating said arc discharge, for de-energizing said standard integrator charge and discharge relays to discharge said standard integrator capacitor, and for energizing said ratchet relay, said ratchet relay provided with a pair of contacts which are alternately closed and opened for each energization of said ratchet relay, said contacts, when closed, providing a circuit from said D.C. source to all of said capacitor interchange relays of said element integrator units, whereby during one read-out cycle said interchange relays are energized such that corresponding ones of said element integrator capacitors, charged by a previous exposure, are read out while the other corresponding ones of said element integrator capacitors are receiving a charge from a current exposure, and during the next read-out cycle said interchange relays are de-energized to reverse the charge and read circuits to said element integrator capacitors, such that alternate energization and de-energization of said capacitor interchange relays for a plurality of read-out cycles permits the rapid, successive analysis of said plurality of sample materials; and circuit means for suppressing said arc termination function, said standard integrator capacitor discharge function, and said ratchet relay capacitor interchange function of said recorder full scale second microswitch for all positions of said stepping switches except their home position.

2. The system set forth in claim 1 and further including a recycle switch, said recycle switch having a normal off position and an on position, and circuit means controlled by said recycle switch in the on position for preventing discharge of said element integrator capacitors at the end of a read-out cycle, for preventing said ratchet relay from being actuated at the end of said read-out cycle, and for preventing termination of the rotation of said recorder drum and stepping switches, such that said element integrator capacitors just read out may be sequentially read out again.

3. The system set forth in claim 1, wherein said element integrator units are each provided with a fifth normally de-energized relay, said fifth relays having double pole-double throw contacts which are interwired with the double pole-double throw contacts of said interchange relays in such a manner that when said interchange relays are activated to reverse the charge circuits to said capacitors through one set of said double pole-double throw contacts of said element integrator interchange relays, the read circuits of these capacitors are reversed through the contacts of said de-energized fifth relays and the other set of said double pole-double throw contacts of said element integrator interchange relays; means for energizing all of said fifth relays of said element integrators for effecting a connection from the capacitors, receiving a charge from a current arc exposure, to said output lines such that a selected one of said sample integrator unit charge receiving capacitors can be measured by said amplifier and recorder meter as a charge is accumulating in this selected capacitor.

4. The system set forth in claim 1, and further including zero and sensitivity control circuits for each element channel; and a second group of selector stepping switches coupled to said stepping switch control means, said second group of stepping switches sequentially coupling said zero and sensitivity control circuits into said amplifier whereby the meter readings of said chart recorder are made to fall within the meter range thereof.

5. In a spectrochemical analyzing system for measuring the individual concentrations of a plurality of impurity elements in each of a plurality of sample materials in successive read-out cycles, including an arc stand provided with an arc discharge for exposing one of said sample materials thereto to form separate spectral lines for said impurity elements, a spectrometer unit having a plurality of respective photomultipliers for intercepting said spectral lines, a plurality of element integrator units and an internal standard integrator unit, each of said element integrator units and said internal standard unit provided with a first capacitor and coupled to said photomultipliers for receiving and accumulating a charge from said photomultipliers, selector stepping switches for sequentially switching the output circuits of said integrator units to an amplifier circuit and chart recorder for measuring and indicating the accumulated charge in each of said integrator units as an indication of the respective impurity element concentrations, the improvement comprising a second capacitor in each of said element integrator units, relay means in each of said element integrator units for switching said first capacitor of each of said element integrator units, charged by a previous arc exposure, into said output circuits during a given read-out cycle, while at the same time switching said second capacitor of each of said element integrator units into said photomultiplier circuits to receive a charge from an arc exposure during said given read-out cycle for said first capacitors, said standard integrator unit being coupled to receive a charge from an associated photomultiplier during said given read-out cycle and to be switched into said amplifier circuit at the end of said given read-out cycle, means operated by a full-scale reading of said recorder when said standard integrator unit is in circuit therewith for operating said relay means for effecting a reversal of connections of said charge circuits and output circuits of said respective first and second capacitors of each of said element integrator units such that said second capacitors are read-out and said first capacitors will receive a charge from the next arc exposure during the next read-out cycle, and circuit means for suppressing the relay control function of said recorder full-scale operating means for all positions of said stepping switches except their home position.

References Cited

UNITED STATES PATENTS

| | | | |
|---|---|---|---|
| 2,673,956 | 3/1954 | Beard | 320—1 X |
| 2,675,734 | 4/1954 | Hasler et al. | 88—14 |
| 3,102,921 | 9/1963 | Peras | 88—14 |

JEWELL. H. PEDERSEN, *Primary Examiner.*

F. L. EVANS, *Assistant Examiner.*